(12) United States Patent
Elliott

(10) Patent No.: US 7,120,349 B2
(45) Date of Patent: Oct. 10, 2006

(54) FIBER OPTIC CABLE DEVICE WITH RETRACTABLE OPERATION

(75) Inventor: Stephen J. Elliott, Sacramento, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 400 days.

(21) Appl. No.: 10/282,871

(22) Filed: Oct. 29, 2002

(65) Prior Publication Data

US 2004/0081404 A1 Apr. 29, 2004

(51) Int. Cl.
B65H 75/38 (2006.01)
G02B 6/00 (2006.01)

(52) U.S. Cl. .................... 385/137; 242/388.6
(58) Field of Classification Search ......... 385/134–137; 242/388.6
See application file for complete search history.

(56) References Cited

U.S. PATENT DOCUMENTS

| | | | | |
|---|---|---|---|---|
| 4,798,432 A | * | 1/1989 | Becker et al. | 385/135 |
| 5,748,821 A | * | 5/1998 | Schempp et al. | 385/76 |
| 6,042,043 A | * | 3/2000 | Wislinski | 242/473.9 |
| 6,222,976 B1 | * | 4/2001 | Shahid | 385/134 |
| 6,405,961 B1 | * | 6/2002 | Mastrangelo | 242/378.1 |
| 6,408,124 B1 | * | 6/2002 | Holman et al. | 385/135 |
| 6,416,005 B1 | * | 7/2002 | Liao | 242/378.1 |
| 6,520,444 B1 | * | 2/2003 | Muller | 242/378.4 |
| 6,533,205 B1 | * | 3/2003 | Kles | 242/362 |
| 6,591,054 B1 | * | 7/2003 | Afflerbaugh et al. | 385/135 |
| 6,625,374 B1 | * | 9/2003 | Holman et al. | 385/135 |
| 6,643,444 B1 | * | 11/2003 | Putnam | 385/135 |
| 6,668,126 B1 | * | 12/2003 | Knox et al. | 385/135 |
| 6,682,010 B1 | * | 1/2004 | Pohl | 242/386 |
| 6,685,128 B1 | * | 2/2004 | Healy | 242/445 |

* cited by examiner

Primary Examiner—Dean A. Reichard
Assistant Examiner—Adolfo Nino

(57) ABSTRACT

A device for providing variable length fiber optic cable and storing any excess not used. Means are provided to allow for extending and retracting fiber optic cable to prevent excess slack when in use. Optical coupling units provide optical coupling of fiber optic cable within the device. Multiple devices may be connected together to provide variable length fiber optic cable in different directions.

11 Claims, 6 Drawing Sheets

FIBER OPTIC CABLE DEVICE WITH RETRACTABLE OPERATION

FIELD OF THE INVENTION

The present invention relates generally to optical fiber and optical fiber assemblies, and more particularly to a device for storing fiber optic cable that provides retractable operation to store excess cable therein.

BACKGROUND OF THE INVENTION

The use of fiber optic cable and associated components (e.g., optical connectors) to communicate information has increased dramatically, due in part to the increased need to transmit larger amounts of information more rapidly (e.g., real-time video). These higher data speeds can be met using an optical fiber medium. Essentially, transmission of information using fiber optics is achieved using light pulses that traverse along a glass or plastic optical wire or optical fiber. Thus, as the need for faster communication has grown, optical fiber, because of its ability to transmit more information at higher speeds, is replacing conventional copper wire for providing everyday communication links. For example, many telephone companies are employing optical fiber for use in their long distance lines. Further, not only is more data transmitted at higher speeds, but optical fiber is less subject to interference (e.g., electromagnetic interference), thereby reducing the need to retransmit or amplify signals.

As recognized by the inventor hereof, with the increased use of fiber optic technology, and in particular fiber optic cable, specific connectors to connect communicating devices to, for example, a wall outlet or interface will be needed. Further, different lengths of fiber optic cable will be needed depending upon the particular applications. For example, in much the same way that it is common to connect telephone cable to a telephone jack to provide communication using a telephone within a home, similar types of connections will be required for fiber optic interfaces. However, because of the extremely small diameter of fiber optic cable, problems arise that are not present when using traditional communication wire (e.g., telephone wire). In particular, fiber optic cable has a much greater tendency to become tangled, thereby requiring careful deployment of the cable, for example, when variable cable length is needed. Further, the likelihood of tangled cable increases significantly as the length of cable increases, thereby requiring time and effort to untangle the cable. Additionally, the chance of damage to exposed fiber optic cable (e.g., between a device and a wall connection), for example, when tangled and knotted, is increased, due in part to a minimum bend radius, which if exceeded, will damage (i.e., snap) the cable. It is also more difficult to cut fiber optic cable and provide connectors on the cable than with other types of wire (e.g., copper wire).

SUMMARY OF THE INVENTION

The inventor has perceived a need for a device that allows for the use of fiber optic cable (e.g., connection from a fiber optic wall interface or outlet to a device or between devices in a Storage Area Network (SAN)), while minimizing the slack in the fiber optic cable to reduce the chance of the cable becoming tangled or damaged. Further, it is desirable for such a device to allow for easy adjustment of cable length to accommodate devices connected together at different distances, and to have connectors provided therewith.

The present invention provides a device adapted for allowing use of variable length fiber optic cable. In particular, the device allows for extension of cable when extra length is needed, and retraction of cable to take up any slack. Generally, a cable winding mechanism allows for extension and retraction of cable as needed or desired and optical coupling units provide for optical coupling of different cables.

Specifically, a device of the present invention for providing a variable length of fiber optic cable while minimizing excess cable includes means for retractably winding optical fiber on at least one spool. The device may include a first spool and a second spool configured for independent retractable winding. The device may further be provided wherein a first optical fiber is provided for retractable winding in connection with the first spool, and a second optical fiber is provided for retractable winding in connection with the second spool. Further, the first and second optical fibers may be optically coupled, which may be provided using an optical light pipe. Additionally, the first optical fiber may be provided for retractable winding in connection with the at least one spool and the second optical fiber may be of a fixed length. The means for retractably winding optical fiber may be spring loaded. The first and second spools may be configured in parallel arrangement or in concentric to the arrangement.

Another embodiment of the present invention provides a device adapted to provide fiber optic cable of variable length and includes a first rotatable member adapted for maintaining fiber optic cable therearound, a second rotatable member adapted for maintaining fiber optic cable therearound, and a fiber optic connection member for optically connecting the fiber optic cable of the first rotatable member and the second rotatable member. The fiber connection member may include an optical pipe having an inner lens and an outer lens. Further, a spring mechanism may be provided and adapted for automatically rotating the first and second rotatable members to retract each of first ends of the fiber optic cable.

In yet another embodiment of the present invention, an adjustable length fiber optic coupler is provided and includes a first fiber optic section terminating in a free end having a first connector, a second fiber optic section optically coupled to the first fiber optic section and terminating in a free end having a second connector, and a retractor for selectively winding and unwinding the first and second fiber optic sections to adjust the length of the fiber optic coupler. The first and second fiber optic sections may be opposite ends of a single continuous fiber optic cable or may be separate fiber optic cables optically coupled together. Further, the retractor may include a first winding mechanism for selectively winding the first fiber optic section and a second winding mechanism for selectively winding the second fiber optic section independent of the first winding mechanism.

In still another embodiment of the present invention an adjustable length fiber optic coupler includes a first fiber optic section terminating in a free end having a first connector, a second fiber optic section optically coupled to the first fiber optic section and terminating in a free end, and a retractor for selectively winding and unwinding the first fiber optic section to adjust the length of the fiber optic coupler. The first and second fiber optic sections may be separate fiber optic cables optically coupled together. The first fiber optic section may include duplex cable and the second fiber optic section may include simplex cable. The adjustable length fiber optic coupler may also include a plurality of optical coupling units optically coupling the fiber optic sections. The optical coupling units may include a lens and mirror assembly for directing light to the fiber optic sections and may be configured in axial alignment.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the present invention is described in connection with using cable of a specific length and a particular connector, it is not so limited, and different lengths of cable with different connectors are contemplated.

The present invention provides a device that allows for use of variable length of fiber optic cable while minimizing excess cable (i.e., slack). Essentially, a winding mechanism, that may include one or more rotatable components allows for manual adjustment of the fiber optic cable length. Further, multiple winding mechanisms or devices may be connected together as desired or needed.

Figure 1:
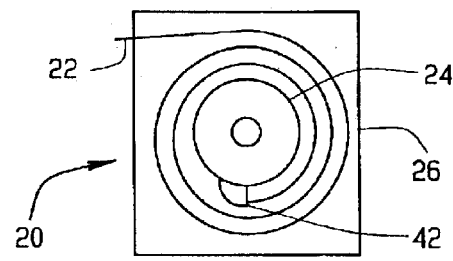
FIG. 1 is a side cross-sectional view of a fiber optic cable device constructed according to the principles of the present invention.
Figure 2:
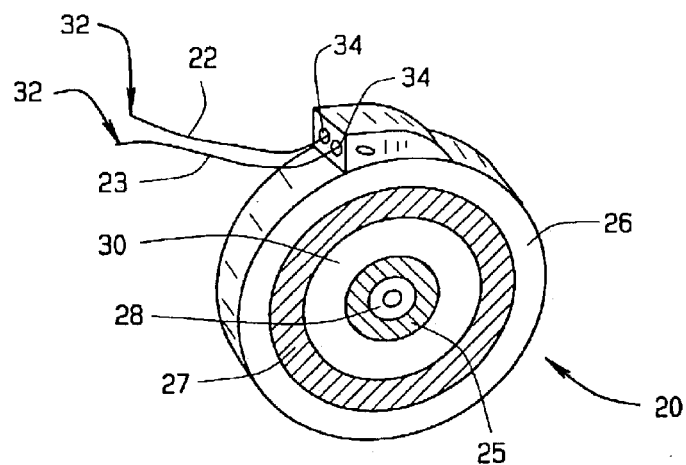
FIG. 2 is a perspective view of a fiber optic cable device of the present invention.

In general, and as shown in FIGS. 1 and 2, a fiber optic cable device 20 constructed according to the principles of the present invention for providing fiber optic cable 22, 23 of variable length generally includes a winding mechanism 24 (e.g., a drum) within a housing 26. The winding mechanism 24 allows for manual operation (i.e., rotation) to extend the available length of fiber optic cable 22, 23 from an access opening and retract any additional length (i.e., slack). More preferably, the winding mechanism is configured for automatic retraction (e.g., spring loaded or using an elastic band) of fiber optic cable to minimize excess length.

Figures 5A, 5B:
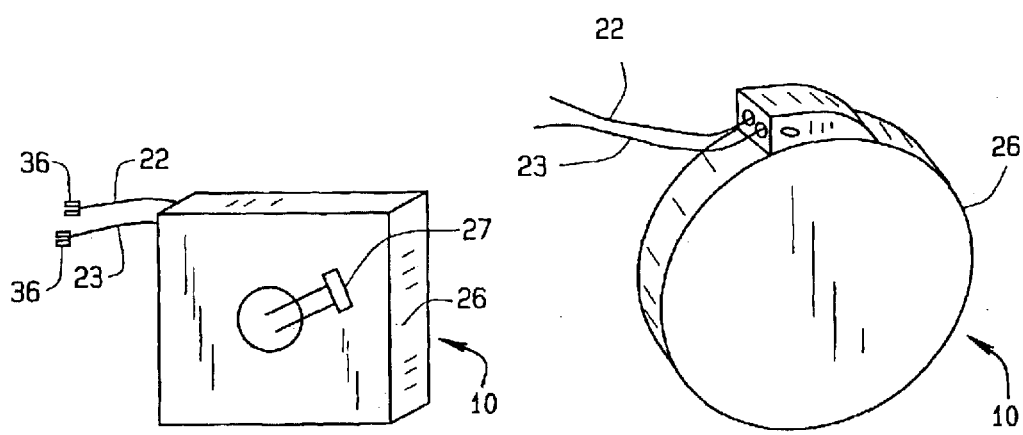
FIGS. 5(a) and 5(b) are schematic diagrams of different constructions of fiber optic cable devices of the present invention.
Figure 6:
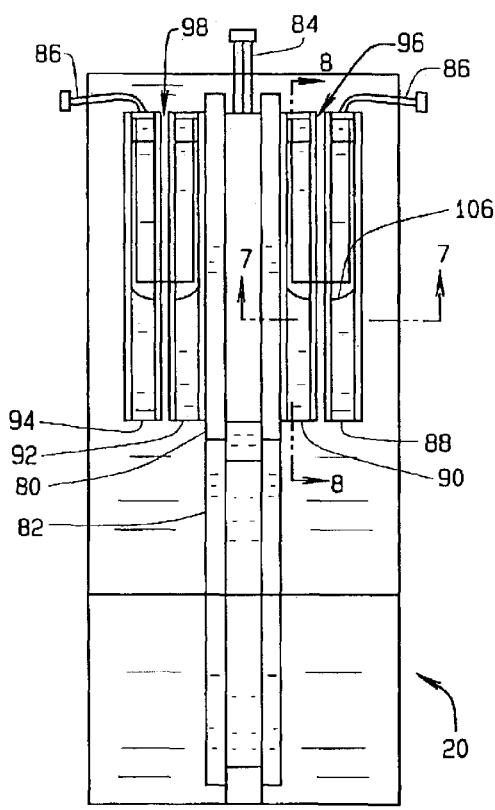
FIG. 6 is plan view of a fiber optic cable device of the present invention having optical coupling units therein.

Referring to one embodiment as shown in FIG. 2, the winding mechanism 24 includes two rotatable members 28, 30 allowing for independent adjustment of the length of separate fiber optic cables 22, 23 extending from the housing 26. In particular, each rotatable member 28, 30 is constructed to accommodate a separate length of fiber optic cable 22, 23 (e.g., 5 meters each). As shown, each rotatable member is constructed as a generally circular spool configured in concentric arrangement for winding and unwinding the separate lengths of fiber optic cable 22, 23. Two light paths 25, 27 are provided for transmission of light through the fiber optic cables 22, 23 as described in more detail herein. It should be noted that different sizes and configurations of rotatable members 28, 30 are possible (e.g., side by side alignment). It further should be noted that the housing 26 preferably is configured to accommodate the size and shape of the rotatable members 28, 30 (e.g., generally circular shape to accommodate lengths of fiber optic cable 22, 23) as shown in different exemplary constructions in FIGS. 5(a) and 5(b). Further, additional control components may be provided, including for example, a handle 27 for rotating the rotatable members 28, 30 as shown in FIG. 5(a).

Figure 3:
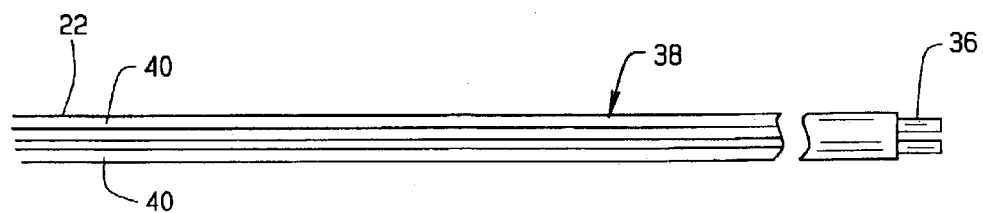
FIG. 3 is a plan view of fiber optic cable that may be used in connection with a fiber optic cable device of the present invention.
Figure 4A:
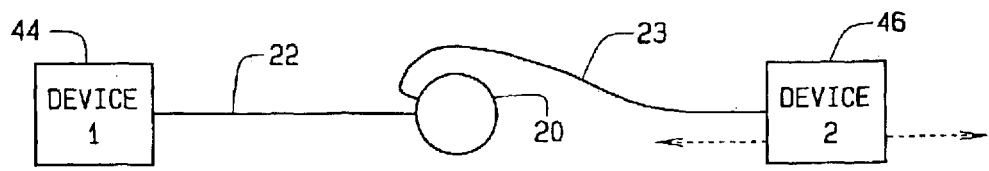
FIGS. 4(a)–4(d) are block diagrams showing fiber optic cable devices of the present invention in use.
Figure 4B:
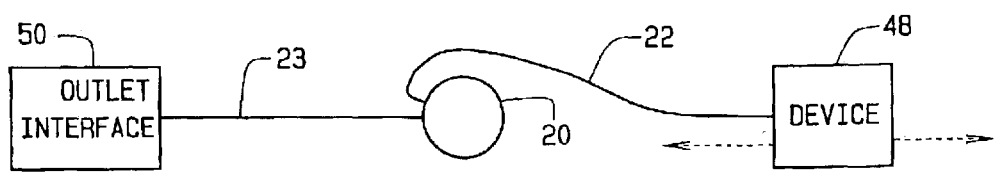
Figure 4C:
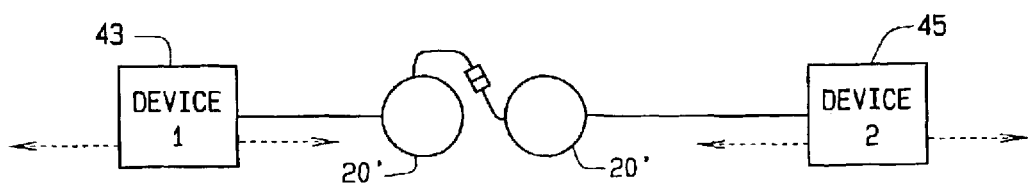
Figure 4D:
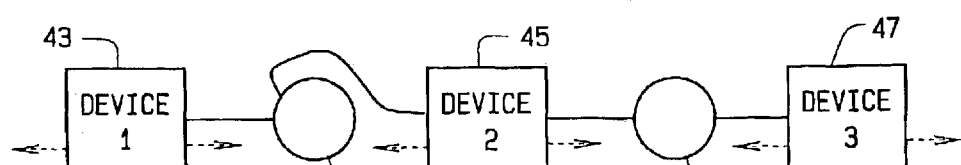

One end 32 of each length of the fiber optic cable 22, 23 extends from the housing 26 as shown in FIG. 2. Preferably, separate openings 34 are provided within the housing 26 to access each of the fiber optic cables 22, 23. Each of the ends 32 of fiber optic cable 22, 23 preferably include a fiber optic type connector 36 (e.g., LC, SC or other standard connector) as shown in FIG. 3. Further, the fiber optic cable 22, 23 is generally encased within a plastic housing 38 and may include one or more fibers 40 (i.e., fiber channels) therein for providing communication of optical signals via light pulses.

Figure 11:
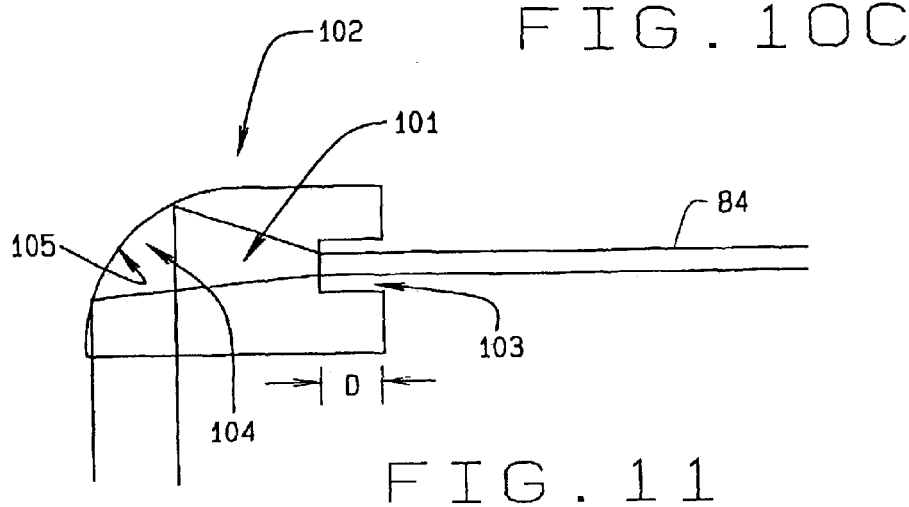
FIG. 11 is a side plan view of an optical junction of the present invention.

An optical coupling means, such as, for example, an optical junction 102 as shown in FIG. 11 is provided to optically couple the first length of fiber optic cable 22 and the second length of fiber optic cable 23, which may be provided, for example, on the first and second rotatable members 28, 30. In one construction, a separate holographic lens may be provided on a reflective surface for optically coupling (i.e., connecting) each of the second ends (not shown) of the fiber optic cable 22, 23. In this construction, an inner lens and an outer lens are each provided to optically couple (i.e., connect) the fiber optic cable 22 on each of the rotatable members 28, 30 (e.g., inner and outer spools).

Figure 12A:
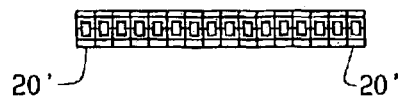
FIG. 12(a) is a side elevation view of a plurality of fiber optic cable devices of the present invention configured as a single unit.
Figure 12B:
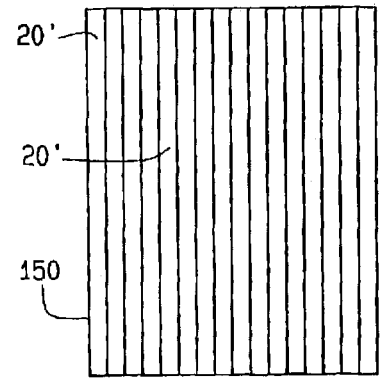
FIG. 12(b) is a top plan view of a plurality of fiber optic cable devices of the present invention configured as a single unit.
Figure 12C:
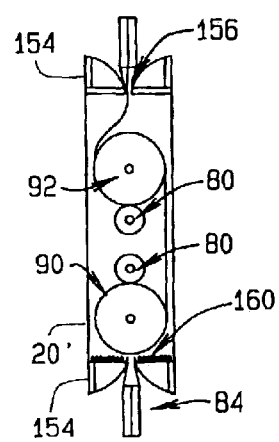
FIG. 12(c) is a side cross-sectional view of one of the fiber optic cable devices of the unit of FIGS. 12(a) and 12(b)
Figure 13:
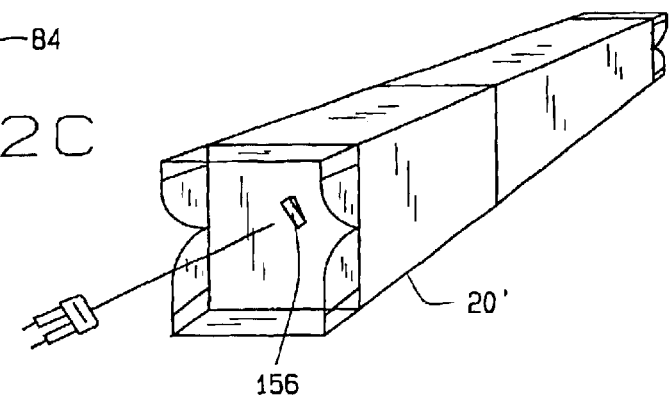
FIG. 13 is a top perspective view of two fiber optic cable devices of the present invention connected together.
Figure 14:
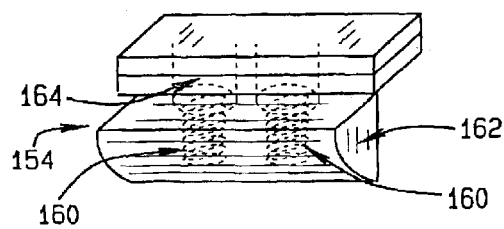
FIG. 14 is perspective view of a braking mechanism for a fiber optic cable device of the present invention.
Figure 15:
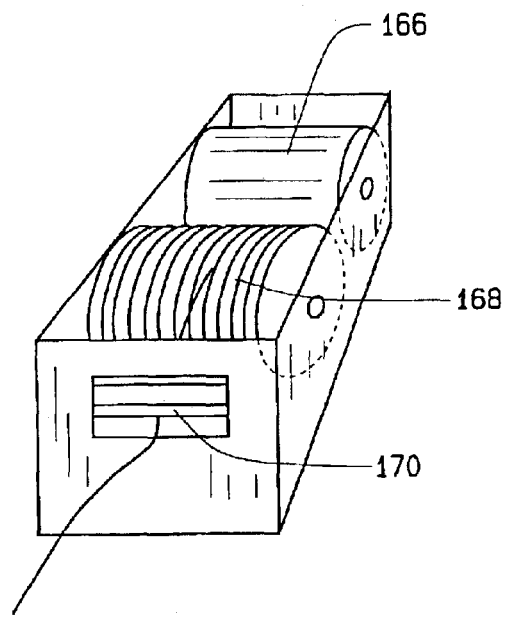
FIG. 15 is a perspective view of another fiber optic cable device of the present invention showing a geared braking mechanism therein.

In another construction of a fiber optic cable device 20' of the present invention and as shown in FIGS. 6 through 9 and 12 through 16, the rotatable members are configured along a vertical axis relative to each other. In this construction, the rotatable members 80, 82 are configured to provide rotation opposite to each other and allow for variable length of fiber optic cable, which in this construction is duplex fiber optic cable 84. The rotatable member 80 may be provided with gears (not shown) to allow for incremental adjustment of the length of the fiber optic cable 84. The rotatable member 82 is preferably constructed having an automatic rewind mechanism (e.g., spring loaded or an elastic band) to allow for automatic retraction of the fiber optic cable 84. Excess fiber optic cable 84 is preferably stored (i.e., wound around) on the rotatable member 82. A brake mechanism as shown in FIGS. 14 and 15 may also be provided to lock the rotatable member 82 and prevent retraction of the fiber optic cable 84. However, any suitable braking device for stopping the retraction or extension of the fiber optic cable 84 may be provided. Further, it should be noted that the rotatable members 80, 82 are preferably provided as spools, bobbins or other similar devices.

In this construction, fixed length fiber optic cable, which is simplex fiber optic cable 86, is optically coupled to the duplex fiber optic cable 84 using optical coupling units 88, 90, 92 and 94. The optical coupling units provide distinct optical paths for coupling the duplex fiber optic cable 84 to each of the simplex fiber optic cables 86. The optical coupling units 88, 90, 92 and 94 are preferably constructed in a circular shape to provide the optical paths as described in more detail herein It should be noted that the simplex fiber optic cable 86 may be routed to the top, bottom or side of the fiber optic cable device 20' depending upon the particular requirements.

Preferably, optical coupling units 88, 94 are connected (e.g., by welding or glue solvent) to the housing 26 to prevent rotation. Optical coupling units 90, 92 are preferably connected to the rotatable member 80 to provide for rotation as a single unit. In an alternate construction as shown in FIG. 12(c) a separate rotatable member 80 (e.g., winding mechanism) may be provided in connection with each of the coupling units 90 and 92.

Figure 10A:
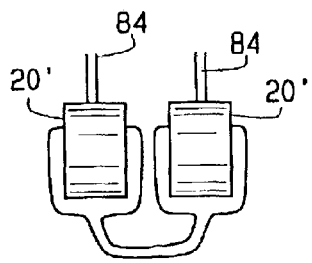
FIGS. 10(a)–10(c) are simplified plan views of different connections for use with the present invention.
Figure 10B:
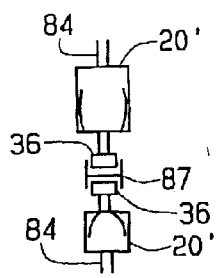
Figure 10C:
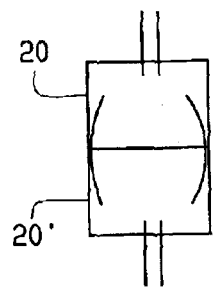

As shown in FIGS. 6 through 9, bearings 100 are preferably provided between rotatable members 88, 90 and rotatable members 92, 94 in the grooves 96, 98, respectively, to facilitate rotation. Essentially, the fiber optic cable device 20' integrates mechanical and optical components (i.e., mechanical winding mechanisms and optical coupling units) to allow for optical coupling of fiber optic cable that is adapted for adjustable extension and retraction. It should further be noted that multiple fiber optic cable devices 20' may be connected together, for example as a single unit 150 as shown in FIGS. 12(a) and 12(b) to provide for variable length duplex fiber optic cable 84 at different ends, by connecting the simplex fiber optic cables 86 of separate fiber optic cable devices 20'. Different exemplary configurations for connecting the ends of the fiber optic cable 84 as shown in FIGS. 10(a)–10(c) provide different connection arrangements using multiple fiber optic cable devices 20', as well as different connection arrangements of rotatable members within the fiber optic cable devices 20'. In particular, the ends of the fiber optic cable 84 may be spliced together as shown in FIG. 10(a). The ends of the fiber optic cable 84 having fiber optic type connectors 36 may be connected using an optical connection 87 as shown in FIG. 10(b). Separate fiber optic cable devices 20' may be fused together as shown in FIG. 10(c) to provide a physical connection.

Figure 7:
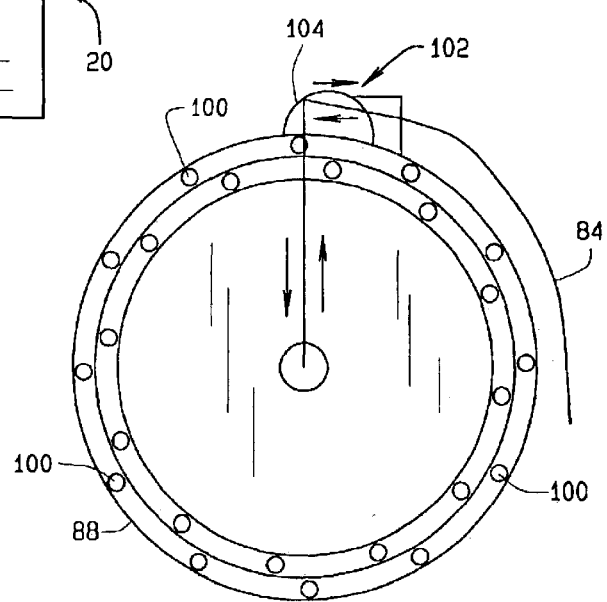
FIG. 7 is a cross-sectional view of an optical coupling unit of the present invention taken along the line 7—7 in FIG. 6.
Figure 9:
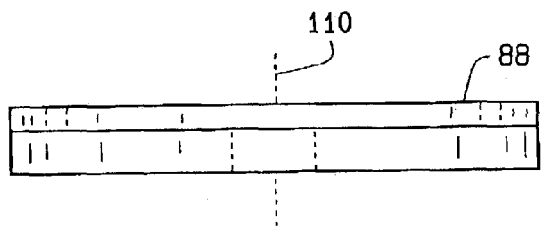
FIG. 9 is an elevation view of an optical coupling unit of the present invention.

As shown in more detail in FIG. 7, rotatable member 88 is constructed as a generally circular member and includes an optical junction 102 for providing an optical path through the rotatable member. It should be noted that rotatable members 90, 92, 94 are constructed and operate in the same manner as rotatable member 88. The optical junction 102 comprises a lens and mirror assembly 104 for focusing light in the X/Y direction (i.e., upward and downward, and left and right relative to FIG. 6) as shown by the arrows. As shown in more detail in FIG. 11, the lens and mirror assembly 104 is preferably constructed as a single polycarbonate unit, but may be constructed of any suitable material. For example, the mirror may be constructed of plastic, acrylic or a sprayed metal. The optical fiber 84 extends a distance D into an opening 103 of the optical junction 102. In operation, the light output of the optical fiber 84 has divergence as shown in FIG. 11 and indicated generally by reference numeral 101. The curved portion 105 of the lens and mirror assembly 104 is configured as both a lens and a mirror to, both collimate the light output from the optical fiber 84 to form a straight light beam (i.e., collimated beam) and redirect the light path into the rotatable members. Essentially, a curved mirror provides internal reflection. Collimation is provided in the X axis by the lens and mirror assembly 104 having curved portion 105, and collimation is provided in the Z axis by the curved portion 106.

Figure 8:
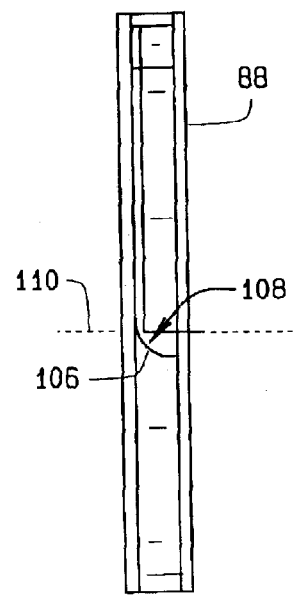
FIG. 8 is a cross sectional view of an optical coupling unit of the present invention taken along the line 8—8 in FIG. 6.

As shown in FIG. 8, light is focused in the Z direction (i.e., axially relative to FIG. 8) with a curved portion 106, that may be constructed of plastic and formed by injection molding or as a separate unit thereon with laser ablation. Essentially, a gap 108 is provided near the center axis 110 with the curved portion 106 to couple light to an adjacent optical coupling unit to provide a light path (e.g., when multiple optical coupling units are provided). Preferably, the optical coupling units are constructed having about the same diameter of the fiber optic cable to be used.

In operation, the lens and mirror assembly 104 and curved portion 106 cause the incident angle of light to be greater than the critical angle of light. Thus, total internal reflection of light is achieved and used to propagate light through a fiber optic cable with the fiber optic cable device 20'. With the light optically coupled between the optical coupling units 88, 90, 92, 94, the rotatable members 80, 82 are operable to provide variable length fiber optic cable.

Referring now specifically to FIGS. 12 through 16, using multiple fiber optic cable devices 20', a rack mount unit 150 that includes a plurality of connected fiber optic cable devices 20' on both the front and back of the rack mount unit 150 may be provided (e.g., sixteen fiber optic cable devices 20' on each of the front and the back). In this embodiment, a braking mechanism 154 is provided and may be released using a brake release member 156 (e.g., brake release switch or lever). Further, variable lengths of optical fiber adjustment may be provided (e.g., one meter length on one side and ten meter length on the other side).

Further, as shown in FIG. 13, the fiber optic cable devices 20' may be mounted back to back in the rack mount unit 150 with each of the fiber optic cable devices 20' providing individual cable-length adjustment (e.g., cable extension and retraction on both sides) and each having a brake release member 156. In operation, the brake release member 156 is operated (e.g., is moved up) to allow the cable to freely extend or retract. When the brake release member 156 is not activated, the cable is not able to move (i.e., extend or retract) without additional tension (e.g., pulling) of the cable.

With respect to the braking mechanism 154, and as shown more specifically in FIG. 14, the braking mechanism 154 is preferably spring-loaded using a plurality of springs 160 so that a user pushes the brake release member 156 upward to release brake pads 162 to thereby release the fiber optic cable. An alignment slide 164 is preferably provided to align the fiber optic cable. Further, as shown in FIG. 15, a spring-loaded winding assembly 166 may be geared and connected to a duplex cable spool 168, such that the duplex cable spool can incrementally unwind and wind, thereby providing the variable optical cable length. A chamfered cable guide 170 is also provided to protect the fiber optic cable and maintain its orientation.

Figure 16:
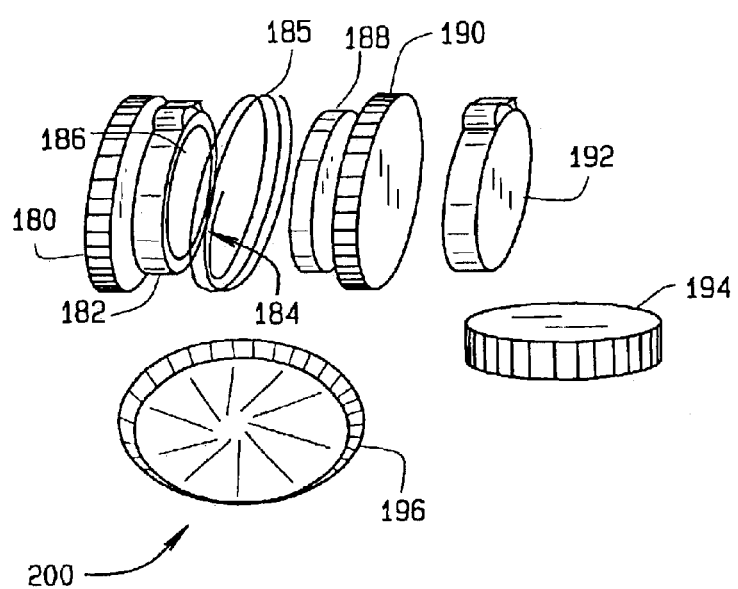
FIG. 16 is an exploded perspective view of another fiber optic cable device of the present invention.

Thus, and as shown in FIG. 16, a fiber optic cable device 200 constructed according to the principles of the present invention may include a gear assembly 180 that slides over a first optical coupling unit 182 where simplex cable divides from duplex cable at a coupling joint 184. The fiber optic cable 185 winds as a spool on a drum 186 that is fused to gear assemblies 188 and 190, but which can freely rotate with respect to a second optical coupling unit 192. It should be noted that different constructions of gear assemblies 194 and 196 may be provided depending upon the gearing requirements (e.g., amount of incremental adjustment for each gear notch). Optical coupling of the first and second optical coupling units 182 and 192 is provided as described herein, for example, using the optical light pipe 42 and/or optical junction 102. Rotation of the drum 186 allows for extension or retraction of the fiber optic cable. Further, a braking mechanism 154 may be provided as described herein.

In operation, and as shown in FIGS. 4(*a*) through 4(*d*), fiber optic cable devices 20 and 20' of the present invention allow for adjustment of fiber optic cable 22, 23 length. For example, a first device 44 and a second device 46 (e.g., two devices in a SAN) may be optically connected by fiber optic cable 22, 23 using the present invention, with the position of one or more of the devices (e.g., second device 46) moved as indicated by the arrows shown in FIG. 4(*a*). The fiber optic storage device 20 of the present invention will allow for extension or retraction of fiber optic cable 22, 23, to accommodate movement of the devices. As another example, and as shown in FIG. 4(*b*), a device 48 optically connected to an outlet interface 50 using a fiber optic cable device 20 of the present invention provides for variable length of fiber optic cable 22, 23. The device 48 may be moved as indicated by the arrows in FIG. 4(*b*), with excess slack in the fiber optic cable 22, 23 connection minimized (i.e., retracted into the housing 26) by the present invention. As yet another example, a first device 43 and a second device 45 (e.g., two devices in a SAN) may be optically connected by fiber optic cable using the present invention, and in particular multiple fiber optic cable devices 20' allow for movement of the devices as indicated by the arrows shown in FIG. 4(*c*). Further, an additional device 47 may be connected with devices 43 and 47 using the multiple fiber optic cable devices 20' rearranged accordingly to support the connection of the device 47. It should also be noted that the fiber optic cable devices 20 and 20' may be configured and connected in other arrangements depending upon particular needs or requirements (e.g., as a single unit 150).

Thus, although a fiber optic cable device 20, 20' of the present invention for use with fiber optic cable is configured in a particular arrangement with specific cable having a particular length, other configurations and lengths of cable are contemplated depending upon the particular application and connections needed or desired. For example, a single rotatable member may be provided allowing for adjustment of one length of fiber optic cable, with the other length fixed. Further, the size of the housing of the present invention may be modified to accommodate for the storage of more or less fiber optic cable.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An optical fiber storage arrangement comprising:
   a spool having a hub about an axis of which an optical fiber can be wound,
      a first optical passage being formed in the hub,
         a first end of the first optical passage being located at a first opening in one end of the hub and
         a second end of the first optical passage extending at least partially through the hub to a second opening therein at which connection with the optical fiber can be made;
   a body to which the spool can be mounted, the body having a second optical passage; and
   a rotary optical coupling between the spool and the body by which
      the spool axially rotates relative to the body, and
      the first optical passage is optically connected to the second optical passage.

2. The arrangement of claim 1, wherein:
   the spool is a first spool and the hub is a first hub;
   the body is a second spool having a second hub about an axis of which another optical fiber can be wound,
      a second optical passage being formed in the second hub,
         a first end of the second optical passage being located at a first opening in one end of the second hub and
         a second end of the second optical passage extending at least partially through the second hub to a second opening therein at which connection with the other optical fiber can be made; and
   the rotary-coupling accommodating coaxial independent rotation of the second hub relative to the first hub.

3. The arrangement of claim 2, wherein:
   the first and second spools are arranged concentrically.

4. The arrangement of claim 2, further comprising:
   a first optical junction located at the second opening of the first hub;
   a first segment of optical fiber, one end of which is optically connected to the first passage via the first optical junction, the first segment being wound around the first hub;
   a second optical junction located at the second opening of the first hub;
   a second segment of optical fiber, one end of which is optically connected to the second passage via the second optical junction, the second segment being wound around the second hub.

5. The arrangement of claim 4, further comprising:
   a mechanism coupled with the first spool that applies a bias force which resists axial rotation of the first spool in a first direction corresponding to unwinding of the optical fiber therefrom and which facilitates axial rotation in a second direction corresponding to winding the optical fiber therearound; and
   a second mechanism coupled with the second spool that applies a bias force which resists axial rotation of the second spool in a first direction corresponding to unwinding of the optical fiber therefrom and which facilitates axial rotation in a second direction corresponding to winding the optical fiber therearound.

6. The arrangement of claim 1, further comprising:

an optical junction located at the second opening of the hub; and a segment of optical fiber, one end of which is optically connected to the first passage via the optical junction, the first segment being wound around the hub.

7. The arrangement of claim 1, further comprising:

a mechanism coupled with the spool that applies a bias force which resists axial rotation of the spool in a first direction corresponding to unwinding of the optical fiber therefrom and which facilitates axial rotation in a second direction corresponding to winding the optical fiber therearound.

8. An optical fiber apparatus comprising:

a spool to which a fiber optic cable can be wound, the spool having a fiber optic cable connector to which the fiber optic fiber cable can be connected;

a body having a fiber optic junction;

a rotary optical coupling having an axis mounted to the body by which the spool rotates about the axis, and optical signals may be passed through the axis between the fiber optic cable connector and the fiber optic junction.

9. The optical fiber apparatus of claim 8, wherein:

the spool is a first spool and the fiber optic cable connector is a first fiber optic cable connector; and the apparatus further comprises a second spool similar to the first spool that includes a second fiber optic cable connector similar to the first fiber optic cable connector, wherein the second spool also rotates about the axis and optical signals also may be passed through the axis between the second fiber optic cable connector and the fiber optic junction.

10. The optical fiber apparatus of claim 9, wherein the first and second spools are arranged concentrically.

11. The optical fiber apparatus of claim 8, further comprising:

a mechanism coupled with the spool that applies a bias force which resists axial rotation of the spool in a first direction corresponding to unwinding of the fiber optic cable therefrom and which facilitates axial rotation in a second direction corresponding to winding the fiber optic cable therearound.

* * * * *